United States Patent
Oh et al.

(10) Patent No.: US 8,611,200 B2
(45) Date of Patent: Dec. 17, 2013

(54) PHOTO DETECTING ELEMENT, AND OPTICAL PICK-UP DEVICE AND OPTICAL DISC DRIVE INCLUDING THE PHOTO DETECTING ELEMENT

(75) Inventors: Jung-bae Oh, Suwon-si (KR); Jin-ho Jung, Seoul (KR); Jong-hwa Yu, Yongin-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/569,777

(22) Filed: Aug. 8, 2012

(65) Prior Publication Data

US 2013/0182546 A1    Jul. 18, 2013

(30) Foreign Application Priority Data

Jan. 13, 2012    (KR) .................. 10-2012-0004507

(51) Int. Cl.
*G11B 7/13* (2012.01)
(52) U.S. Cl.
USPC ........................ 369/120; 369/44.41
(58) Field of Classification Search
None
See application file for complete search history.

(56) References Cited

U.S. PATENT DOCUMENTS

| 4,475,182 | A | * | 10/1984 | Hosaka | 369/44.36 |
| 4,707,648 | A | * | 11/1987 | Minami | 318/640 |
| 5,199,015 | A | * | 3/1993 | Edahiro et al. | 369/44.25 |
| 5,231,627 | A | * | 7/1993 | Paul et al. | 369/125 |
| 5,402,404 | A | * | 3/1995 | Saito | 369/44.35 |
| 5,491,682 | A | * | 2/1996 | Dohmeier et al. | 369/124.12 |
| 5,610,883 | A | * | 3/1997 | Yanagawa | 369/44.23 |
| 6,996,038 | B2 | * | 2/2006 | Kuwayama | 369/44.29 |
| 7,092,346 | B2 | * | 8/2006 | Yamamoto | 369/116 |
| 7,365,302 | B2 | | 4/2008 | Yamaguchi et al. | |
| 7,522,487 | B2 | * | 4/2009 | Kiji | 369/44.41 |
| 7,636,286 | B2 | * | 12/2009 | Lee et al. | 369/53.26 |
| 7,907,501 | B2 | * | 3/2011 | Sawada | 369/124.12 |
| 2007/0014212 | A1 | * | 1/2007 | Aoki et al. | 369/44.41 |
| 2007/0086311 | A1 | * | 4/2007 | Higashiyama et al. | 369/120 |

FOREIGN PATENT DOCUMENTS

| JP | 2004-273033 | 9/2004 |
| JP | 2007-26487 | 2/2007 |
| JP | 2008-010677 A | 1/2008 |
| KR | 10-0505646 B1 | 8/2005 |

OTHER PUBLICATIONS

Korean Office Action issued Jan. 23, 2013 in counterpart Korean Patent Application No. 10-2012-0004507 (4 pages, in Korean).

* cited by examiner

*Primary Examiner* — Peter Vincent Agustin
(74) *Attorney, Agent, or Firm* — NSIP Law (57) ABSTRACT

Provided is a photo detecting element that has a simplified structure and that is easily manufactured and assembled, and an optical pick-up device including the photo detecting element. The photo detecting element includes an optical sensor, an amplifier for amplifying a signal from the optical sensor, and a non-linear multi-step variable resistor to adjust a gain of the amplifier.

12 Claims, 5 Drawing Sheets

PHOTO DETECTING ELEMENT, AND OPTICAL PICK-UP DEVICE AND OPTICAL DISC DRIVE INCLUDING THE PHOTO DETECTING ELEMENT

CROSS-REFERENCE TO RELATED APPLICATION(S)

This application claims the benefit under 35 USC §119(a) of Korean Patent Application No. 10-2012-0004507, filed on Jan. 13, 2012, in the Korean Intellectual Property Office, the entire disclosure of which is incorporated herein by reference for all purposes.

BACKGROUND

1. Field

The following description relates to a photo detecting element, and more particularly, to a photo detecting element that has an improved gain adjustment structure, and an optical pick-up device that includes the photo detecting element.

2. Description of Related Art

A photo detecting element such as a photo detector integrated circuit (PDIC) may be used as an optical detector in an optical pick-up device. The PDIC may monitor optical power from an optical source such as a laser diode (LD). Typically, the PDIC further includes a photo diode (PD) and an amplifier. In an optical pick-up device for writing information to and/or reading information from a disc, the photo detecting element is a semiconductor element in which a plurality of parts are integrated so as to generate power calibration and monitor power for an auto power control of the LD that is incident to the disc.

Conventionally, to adjust a gain of the photo detecting element, the gain of an amplifier that is mounted to the photo detecting element is adjusted using an external resistor. Examples of the external resistor include a variable resistor and an array of a plurality of fixed resistors. However, in a gain adjustment structure in which an external resistor is a separate component from the photo detecting element, a size of the optical pick-up device increases and the manufacturing cost of the optical pick-up device also increases.

SUMMARY

In an aspect, there is provided a photo detecting element including an optical sensor, an amplifier configured to amplify a signal from the optical sensor, and a non-linear multi-step variable resistor operating in response to an external signal to adjust a gain of the amplifier.

The non-linear multi-step variable resistor may comprise a plurality of fixed resistors, and a selector switch configured to select one of the plurality of fixed resistors in response to the external signal.

A plurality of the non-linear multi-step variable resistors may be arranged to correspond to a plurality of wavelengths of beams that are incident to the photo detecting element.

The photo detecting element may comprise three non-linear multi-step variable resistors which are arranged to correspond to wavelengths of beams for a compact disc (CD), a digital versatile disc (DVD), and a Blu-ray disc (BD), respectively.

The selector switch may be formed of a semiconductor device.

The non-linear multi-step resistor for gain adjustment may be integrally formed with the photo detecting element.

The amplifier may comprise a first operational amplifier and a second operational amplifier, and the non-linear multi-step variable resistor may be arranged between the first operational amplifier and the second operational amplifier.

In an aspect, there is provided an optical pick-up device including an optical source, an object lens configured to focus a beam from the optical source on a disc, a main optical sensor configured to generate an electrical signal by receiving a beam reflected from the disc, and a photo detecting element comprising an optical sensor configured to generate a monitoring signal by detecting a beam output from the optical source, an amplifier configured to amplify a signal from the optical sensor, and a non-linear multi-step variable resistor configured to adjust a gain of the amplifier in response to an external signal.

The non-linear multi-step variable resistor may comprise a plurality of fixed resistors, and a selector switch configured to select one of the plurality of fixed resistors in response to the external signal.

The photo detecting element may comprise three non-linear multi-step variable resistors which are arranged to correspond to wavelengths of beams for a compact disc (CD), a digital versatile disc (DVD), and a Blu-ray disc (BD).

The amplifier may comprise a first operational amplifier and a second operational amplifier, and the non-linear multi-step variable resistor is arranged between the first operational amplifier and the second operational amplifier.

In an aspect, there is provided an optical disc drive including an optical pick-up device comprising a main optical sensor configured to receive a beam reflected from a disc, a mechanical system configured to perform focusing and tracking operations of the optical pick-up device with respect to the disc, an information processing unit configured to process a signal output from the main optical sensor, and a servo unit for controlling the mechanical system, wherein the optical pick-up device comprises an optical source, an object lens configured to focus a beam from the optical source on a disc, a main optical sensor configured to generate an electrical signal by receiving a beam reflected from the disc, and a photo detecting element comprising an optical sensor configured to generate a monitoring signal by detecting a beam output from the optical source, an amplifier configured to amplify a signal from the optical sensor, and a non-linear multi-step variable resistor configured to adjust a gain of the amplifier in response to an external signal.

The non-linear multi-step variable resistor may comprise a plurality of fixed resistors, and a selector switch configured to select one of the plurality of fixed resistors in response to the external signal.

The photo detecting element may comprise three non-linear multi-step variable resistors which are arranged to correspond to wavelengths of beams for a compact disc (CD), a digital versatile disc (DVD), and a Blu-ray disc (BD).

The amplifier may comprise a first operational amplifier and a second operational amplifier, and the non-linear multi-step variable resistor may be arranged between the first operational amplifier and the second operational amplifier.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
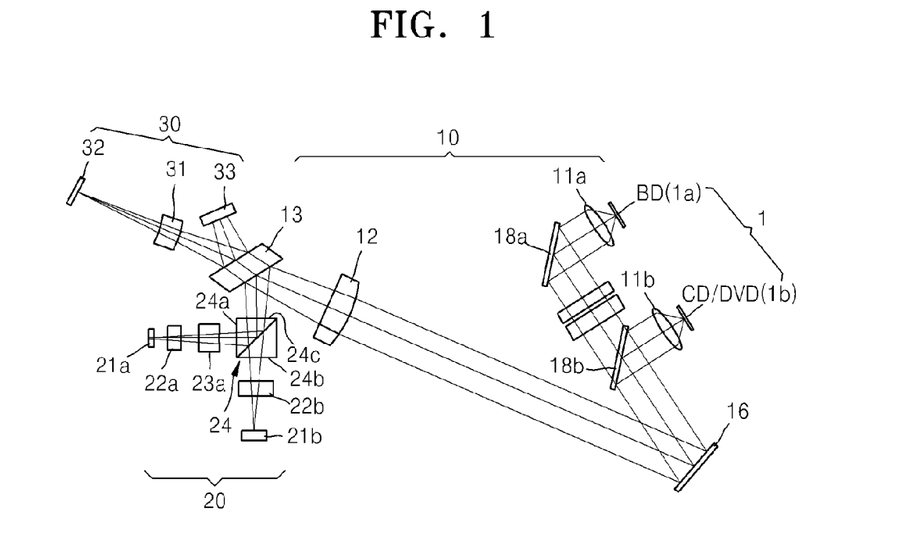
FIG. 1 is a diagram illustrating an example of an optical pick-up device including a photo detecting element.

FIG. 1 illustrates an example of an optical pick-up device including a photo detecting element 33.

Referring to FIG. 1, the optical pick-up device includes an optical transmission system 10, an optical source system 20, and a light receiving system 30. The optical transmission system 10 corresponds to a medium 1 (1a and 1b), and the optical source system 20 provides a plurality of beams for reading information from the medium 1 and/or for writing information to the medium 1. For example, the optical source system 20 may provide three beams including a main beam in a center, and first and second sub-beams at both sides of the center. The light receiving system 30 includes a light-receiving element 32 that has three light-receiving cells for receiving the three beams reflected from the medium 1 so as to read information, and the monitoring photo detecting element 33 that directly receives the three beams from the optical source system 20 and which is referred to as a front photo detector (FPD). The light receiving system 30 may also include a lens 31 to adjust the beams.

In this example, the optical source system 20 includes a first optical source 21a for a Blu-ray disc (BD), a first diffraction device 22a for a BD, a coupling lens 23a, and a first beamsplitter 24. The optical source system 20 also includes a second optical source 21b for a compact disc (CD)/digital versatile disc (DVD), and a second diffraction device 22b for a CD/DVD. The first beamsplitter 24 has a cubic-shaped structure in which a beam from the first optical source 21a and a beam from the second optical source 21b are incident to a first surface 24a and a second surface 24b, respectively. The beams from the first and second optical sources 21a and 21b are commonly emitted via a third surface 24c of the first beamsplitter 24, and the beams therefrom are incident to a second beamsplitter 13. The coupling lens 23a adjusts an optical distance between the first optical source 21a and the medium 1 (1a and 1b) by adjusting optical magnification between the first optical source 21a and the first beamsplitter 24, for example, a defocus amount of travelling light.

The first and second diffraction devices 22a and 22b form a main beam and $\pm 1^{st}$ sub-beams from a single beam via a diffraction effect, wherein the single beam is output from the first and second optical sources 21a and 21b. The main beam and the sub-beams have a polarization component in a first direction (hereinafter, referred to as first polarization), and a polarization component in a second direction (hereinafter, referred to as second polarization). In this example, the second polarization component is in a second direction that is perpendicular to the first direction of the first polarization component. The first and second diffraction devices 22a and 22b may change a distance between the main beam and the sub-beams according to a distance or an interval between their gratings.

The optical transmission system 10 includes an optical path refraction mirror 16 that refracts a path of a beam incident from the second beamsplitter 13, and a dichroic mirror 18b that is located on a reflected beam travel path of a beam reflected from the optical path refraction mirror 16 and that processes a beam having a specific wavelength from among the incident beam. For example, the dichroic mirror 18b may reflect a beam for a CD/DVD and allow a beam for a BD to pass through. The optical transmission system 10 also includes a total reflection mirror 18a that reflects the beam for a BD which passes through the dichroic mirror 18b. Also, a first object lens 11a for a BD is located on a reflected beam travel path of the total reflection mirror 18a, and a second object lens 11b for a CD/DVD is located on a reflected beam travel path of the dichroic mirror 18b.

Figure 2:
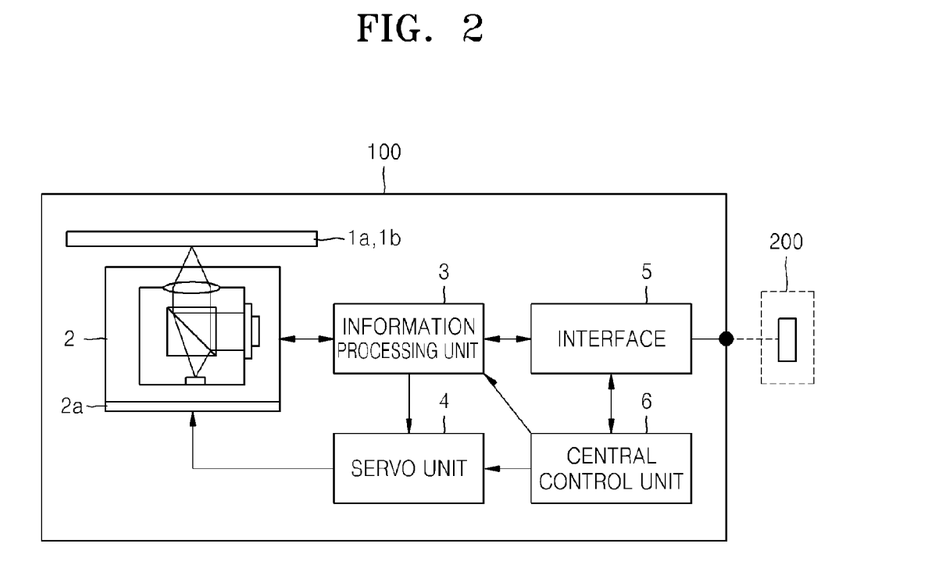
FIG. 2 is a diagram illustrating an example of an optical disc drive including an optical pick-up device.

FIG. 2 illustrates an example of an optical disc drive 100 including an optical pick-up device 2.

Referring to FIG. 2, the optical disc drive 100 includes the optical pick-up device 2, for example, the optical pick-up device of FIG. 1, which is arranged to read information from and/or write information to mediums 1a and 1b. The optical pick-up device 2 may include the optical system and a mechanical system that mechanically supports the optical system and which performs focusing and tracking operations. The optical system may also include an encoder and a decoder that are connected to an information processing unit 3 that is connected to an interface 5 for connection with an external host. Also, the mechanical system may be connected to a servo unit 4. The information processing unit 3, the servo unit 4, and the interface 5 are controlled by a central control unit 6. The interface 5 may conform to various standards, for example, the interface 5 may include a universal serial bus (USB) port, and thus, may be connected to the external host, e.g., a computer 200 according to a USB protocol.

The information processing unit 3 may control the powers of the first and second optical sources 21a and 21b in the optical source system 20, based on a power from the monitoring photo detecting element 33 that directly receives a beam from the optical source system 20. For example, the information processing unit 3 may include an automatic power control (APC) to which a signal from the monitoring photo detecting element 33 is provided. The APC may receive a power from the FPD and output a current that is appropriately compensated for an optical source such as a laser diode.

Figure 3:
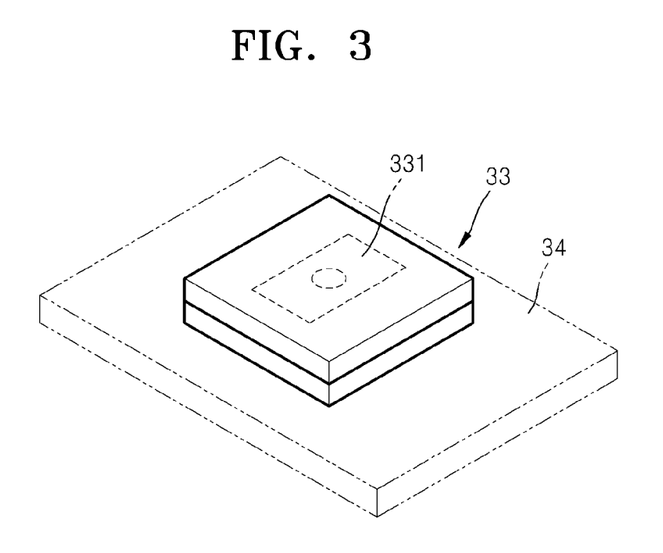
FIG. 3 is a diagram illustrating an example of a photo detecting element.

FIG. 3 illustrates an example of the monitoring photo detecting element 33 also referred to as the FPD. Because the monitoring photo detecting element 33 is small, the monitoring photo detecting element 33 includes a photo diode 331 as an integrated circuit (IC) element mounted on a circuit substrate 34, and an amplifier that amplifies a signal therefrom.

Figure 4:
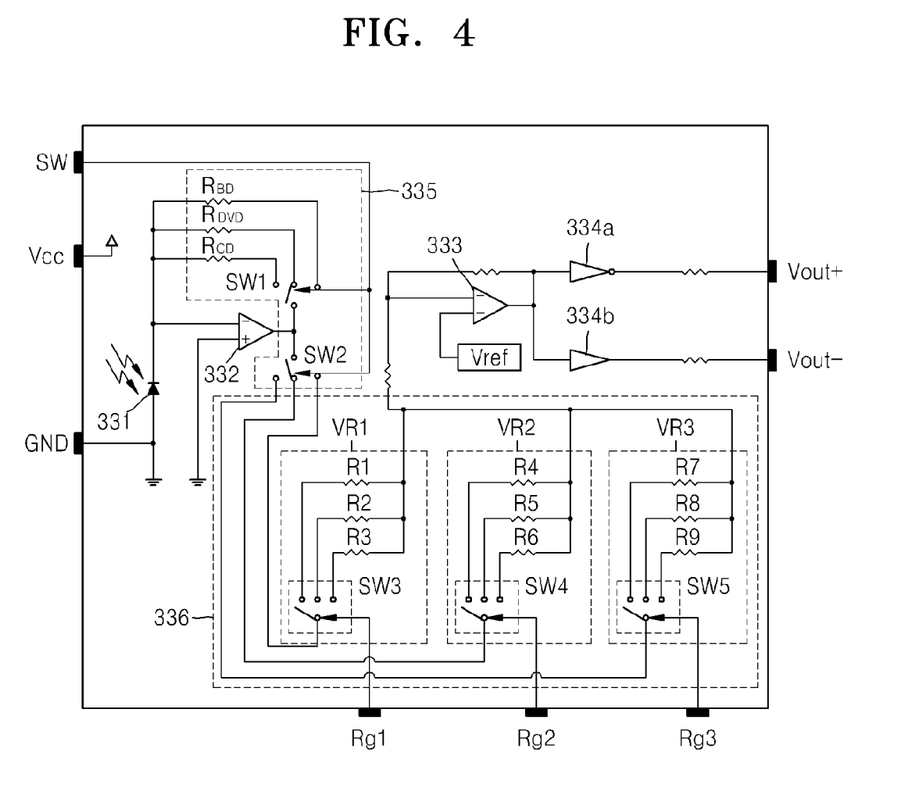
FIG. 4 is a diagram illustrating an example of an equivalent circuit diagram of the photo detecting element.

FIG. 4 illustrates an example of an equivalent circuit of the monitoring photo detecting element 33 that corresponds to three wavelengths (CD/DVD/BD). Referring to FIG. 4, the monitoring photo detecting element 33 has a one-chip structure in which a photo diode 331, a first operational amplifier 332, a first gain selection unit 335, a second operational amplifier 333, and a second gain control unit 336 are arranged. The photo diode 331 may receive an incident beam. In this example, a voltage at a level corresponding to an optical power of the received beam may be induced at the cathode of the photo diode 331.

The first operational amplifier 332 may output a difference between a first input signal and a second input signal. For example, the first input signal may be a voltage at a cathode terminal of the photo diode 331, and the second input signal may be a predetermined reference voltage. In this example, a second input terminal is grounded, so that a value of the second input signal is 0, and thus, the output corresponds to the voltage at the cathode terminal. If a beam is not incident to the photo diode 331, i.e., when an optical source (hereinafter, referred to as 'LD') does not output a beam, the first operational amplifier 332 may output a reference voltage. As another example, if the LD outputs a beam having a maximum intensity, an output from the first operational amplifier 332 may be a minimum value or a predetermined cut-off value.

The first gain selection unit 335 may set an output gain of the first operational amplifier 332. In this example, the first gain selection unit 335 includes a plurality of feedback resistors Rcd, Rdvd, and Rbd that correspond to three wavelengths of beams for CD, DVD, and BD, respectively, and selector switches SW1 and SW2. In this example, the selector switch SW1 selects one of the feedback resistors Rcd, Rdvd, and Rbd in response to a signal that is externally applied to one of the feedback resistors Rcd, Rdvd, and Rbd, and the selector switch SW2 selects one of a plurality of non-linear multi-step variable resistors as further described below.

The first gain selection unit 335 also includes selection circuits that are selected for a case in which the LD outputs an overpower and for a case in which the LD outputs a laser power to write or read information. The first gain selection unit 335 affects the output gain of the first operational amplifier 332. In the example of the overpower output, when an optical power corresponding to the overpower of the LD is input to the photo diode 331, the gain may be adjusted in such a manner that an output from the first operational amplifier 332 becomes a minimum or predetermined cut off voltage such as 1 V. In the example of a write or a read, when an optical power corresponding to a read power of the LD is input to the photo diode 331, the gain of the first operational amplifier 332 may be adjusted in such a manner that an output from the first operational amplifier 332 becomes the same as 1V, which is a minimum or predetermined cut off voltage. A selection signal of the first gain selection unit 335 may be provided from an optical pick-up control unit (not shown) that is included in the information processing unit 3.

The second operational amplifier 333 may compare the output from the first operational amplifier 332 with a reference voltage Vref, and feedback a difference thereof to the optical pick-up control unit of the information processing unit 3. A voltage output from the second operational amplifier 333 may be proportional to the optical power that is incident to the photo diode 331. Reference numerals 334a and 334b in FIG. 4 indicate buffers.

In this example, a plurality of non-linear multi-step variable resistors VR1, VR2, and VR3 are arranged between the first operational amplifier 332 and the second operational amplifier 333 so as to select a gain for each medium. The number of non-linear multi-step variable resistors may correspond to the number of types of mediums that are used. In this example, the three non-linear multi-step variable resistors VR1, VR2, and VR3 are arranged to correspond to a CD, a DVD, and a BD, respectively. For example, the non-linear multi-step variable resistors may be included in the second gain control unit 336.

The non-linear multi-step variable resistor VR1 includes fixed resistors R1, R2, and R3, and a selector switch SW3, the non-linear multi-step variable resistor VR2 includes fixed resistors R4, R5, and R6, and a selector switch SW4, and the non-linear multi-step variable resistor VR3 includes fixed resistors R7, R8, and R9, and a selector switch SW5. The selector switches SW3, SW4, and SW5 may operate in response to a signal that is externally applied thereto via a signal from input ports Rg1, Rg2, and Rg3, respectively. Accordingly, selector switches SW3, SW4, and SW5 respectively select one of the fixed resistors R1, R2, and R3, the fixed resistors R4, R5, and R6, and the fixed resistors R7, R8, and R9, according to a magnitude of an input signal, for example, according to a level of a voltage of the input signal. The selector switches SW1, SW2, SW3, SW4, and SW5 may operate in conjunction with an inner logic circuit to determine the magnitude of the input signal and may be formed of complementary metal-oxide semiconductors (CMOSs).

According to various aspects, a voltage applied to the selector switches SW1, SW2, SW3, SW4, and SW5 may be adjusted at three levels. As shown in Table 1 below, a high level corresponds to a driving voltage Vcc of an IC, a low level corresponds to a ground voltage, and a middle level therebetween may be applied thereto.

TABLE 1

| Levels | Voltage range | Selected resistors |
| --- | --- | --- |
| LOW (Gnd) | 0~0.8 | R1 (R4, R7) |
| MIDDLE (or Open) | 1.5~2.0 | R2 (R5, R8) |
| HIGH (Vcc) | 2.6~Vcc | R3, (R6, R9) |

For example, in response to a signal in a voltage range being applied to each of the selector switches SW1, SW2, SW3, SW4, and SW5, a resistor that corresponds to the signal of that voltage range is selected, and thus, a gain that is applied from the first operational amplifier 332 to the second operational amplifier 333 may be controlled.

Figure 5:
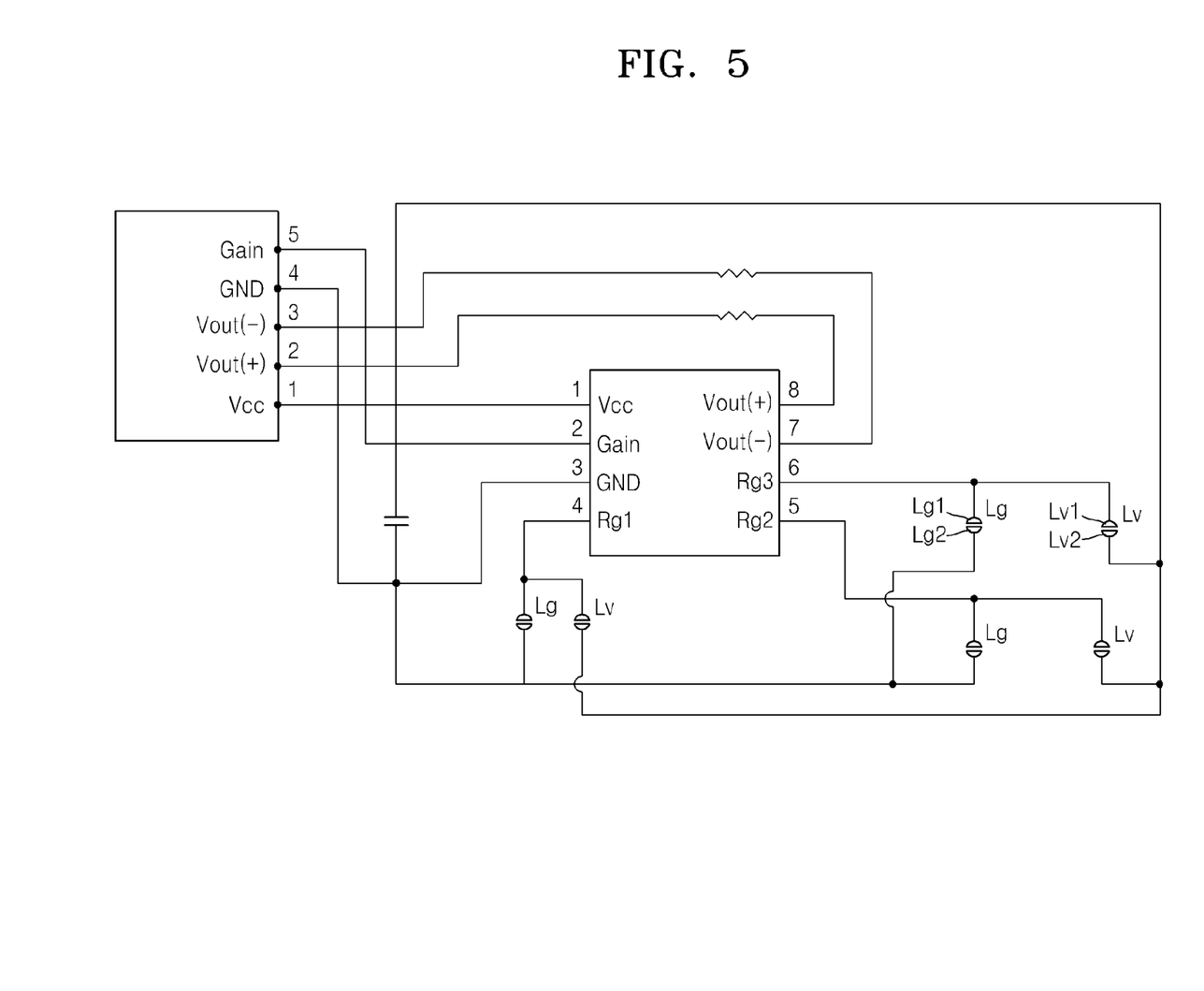
FIG. 5 is a diagram illustrating an example of a photo detecting element gain control circuit to which the photo detecting element of FIG. 4 is applied.

FIG. 5 illustrates an example of a PDIC gain control circuit that has a structure capable of controlling switches having the aforementioned levels. As illustrated in FIG. 5, first and second soldering lands Lg and Lv are connected to each of switch control ports Rg1, Rg2, and Rg3 of the photo detecting element 33. The first and second soldering lands Lg and Lv respectively have soldering patterns Lg1 and Lg2, and soldering patterns Lv1 and Lv2, which are adjacent to each other. The first and second soldering lands Lg and Lv are formed in a circuit substrate or a flexible printed circuit (FPC) in which the photo detecting element 33 may be mounted. In this example, the first soldering land Lg connects the switch control ports R1, R2, and R3 to a ground voltage source GND, and the second soldering land Lv connects a driving voltage Vcc to the switch control ports R1, R2, and R3.

The first soldering land Lg for connection with the ground voltage source and the second soldering land Lv for connection with the driving voltage, which are arranged in each of the switch control ports R1, R2, and R3, may be selectively soldered or may be open together. Thus, if the first soldering land Lg for connection with the ground voltage source is soldered, a corresponding port may have a low level, if the second soldering land Lv for connection with the driving voltage is soldered, a corresponding port may have a high level, and if the two lands are each open, a corresponding port may have a middle level. Accordingly, the selector switches SW3, SW4, and SW5 that correspond to the switch control ports R1, R2, and R3 may operate so that one of resistors is selected and the gain is adjusted.

Unlike a structure of a photo detecting element according to the related art, the photo detecting element 33 having the aforementioned structure is characterized in that resistors for gain adjustment are integrally formed with the photo detecting element 33, and thus, a separate external element is not required to adjust the resistors.

Figure 6:
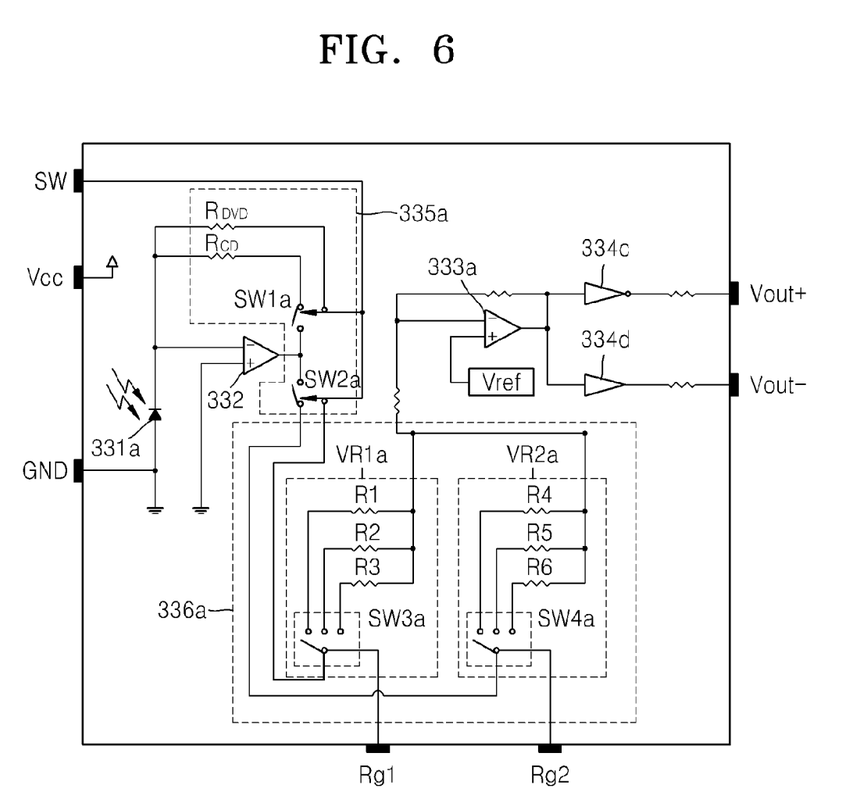
FIG. 6 is a diagram illustrating another example of an equivalent circuit diagram of a photo detecting element.

FIG. 6 illustrates an example of an equivalent circuit of a photo detecting element that corresponds to two wavelengths (i.e., CD/DVD). The photo detecting element has a one-chip structure in which a photo diode 331a, a first operational amplifier 332, a first gain selection unit 335a, a second operational amplifier 333a, and a second gain control unit 336a are arranged.

The photo diode 331a may receive an incident beam, and a voltage at a level corresponding to an optical power of the received beam may be induced to a cathode.

The first operational amplifier 332 may output a difference between a first input signal and a second input signal. For example, the first input signal may be a voltage at a cathode terminal of the photo diode 331a, and the second input signal may be a predetermined reference voltage. In this example, a second input terminal is grounded, so that a value of the second input signal is 0, and thus, the output corresponds to the voltage at the cathode terminal. If a beam is not incident to the photo diode 331a, i.e., when an optical source (hereinafter, referred to as 'LD') does not output a beam, the first operational amplifier 332 may output a reference voltage. As another example, if the LD outputs a beam having a maximum intensity, an output from the first operational amplifier 332 may be a minimum value or a predetermined cut-off value.

The first gain selection unit 335a may set an output gain of the first operational amplifier 332. In this example, the first gain selection unit 335a includes feedback resistors Rcd and Rdvd that correspond to two wavelengths of beams for a CD and a DVD, respectively, and selector switches SW1a and SW2a. In this example, the selector switch SW1a selects one of the feedback resistors Rcd and Rdvd in response to a signal that is externally applied to one of the feedback resistors Rcd and Rdvd, and the selector switch SW2a selects one of a plurality of non-linear multi-step variable resistors. The first gain selection unit 335a also includes selection circuits that are respectively selected for a case in which the LD outputs an overpower and for a case in which the LD outputs a laser power to write or read information. The second operational amplifier 333a may compare the output from the first operational amplifier 332 with a reference voltage Vref, and feedback a difference thereof to an optical pick-up control unit (not shown) of the information processing unit 3. A voltage output from the second operational amplifier 333a may be proportional to the optical power that is incident to the photo diode 331a.

In this example, two non-linear multi-step variable resistors VR1a and VR2a are arranged between the first operational amplifier 332 and the second operational amplifier 333a so as to select a gain of each of the two mediums (i.e., a CD and a DVD). The two non-linear multi-step variable resistors VR1a and VR2a respectively include fixed resistors R1, R2, and R3 and a selector switch SW3a, and fixed resistors R4, R5, and R6 and a selector switch SW4a. The selector switches SW3a and SW4a of the non-linear multi-step variable resistors VR1a and VR2a operate in response to a signal that may be externally applied thereto via respective signal input ports Rg1 and Rg2, and thus, respectively select one of the fixed resistors R1, R2, and R3, and the fixed resistors R4, R5, and R6, according to a magnitude of an input signal, e.g., according to a level of a voltage of the input signal.

According to various aspects, a non-linear multi-step variable resistor is integrally formed in the photo detecting element and the optical pick-up device adopting the photo detecting element. Accordingly, unlike the related art, an external resistor is not required, and costs on parts is saved. Furthermore, because the external part is not separately mounted, the number of part assembling processes is decreased.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A photo detecting element comprising:
   an optical sensor;
   a first operational amplifier configured to amplify a signal from the optical sensor;
   a non-linear multi-step variable resistor formed integrally within the photo detecting element and operating in response to an external signal to adjust a gain of the amplifier; and
   a second operational amplifier configured to amplify a signal from the non-linear multi-step variable resistor,
   wherein an input of the non-linear multi-step variable resistor is electrically connected to an output of the first operational amplifier, and an output of the non-linear multi-step variable resistor is electrically connected to an input of the second operational amplifier.

2. The photo detecting element of claim 1, wherein the non-linear multi-step variable resistor comprises:
   a plurality of fixed resistors; and
   a selector switch configured to select one of the plurality of fixed resistors in response to the external signal.

3. The photo detecting element of claim 2, wherein a plurality of the non-linear multi-step variable resistors are arranged to correspond to a plurality of wavelengths of beams that are incident to the photo detecting element.

4. The photo detecting element of claim 3, wherein the photo detecting element comprises three non-linear multi-step variable resistors which are arranged to correspond to wavelengths of beams for a compact disc (CD), a digital versatile disc (DVD), and a Blu-ray disc (BD), respectively.

5. The photo detecting element of claim 2, wherein the selector switch is formed of a semiconductor device.

6. The photo detecting element of claim 1, wherein the non-linear multi-step resistor for gain adjustment is integrally formed with the photo detecting element.

7. An optical pick-up device comprising:
   an optical source;
   an object lens configured to focus a beam from the optical source on a disc;
   a main optical sensor configured to generate an electrical signal by receiving a beam reflected from the disc; and
   a photo detecting element comprising an optical sensor configured to generate a monitoring signal by detecting a beam output from the optical source, a first operational amplifier formed integrally within the photo detecting element and configured to amplify a signal from the optical sensor, a non-linear multi-step variable resistor configured to adjust a gain of the amplifier in response to an external signal, and a second operational amplifier configured to amplify a signal from the non-linear multi-step variable resistor, wherein an input of the non-linear multi-step variable resistor is electrically connected to an output of the first operational amplifier, and an output of the non-linear multi-step variable resistor is electrically connected to an input of the second operational amplifier.

8. The optical pick-up device of claim 7, wherein the non-linear multi-step variable resistor comprises:
a plurality of fixed resistors; and
a selector switch configured to select one of the plurality of fixed resistors in response to the external signal.

9. The optical pick-up device of claim 8, wherein the photo detecting element comprises three non-linear multi-step variable resistors which are arranged to correspond to wavelengths of beams for a compact disc (CD), a digital versatile disc (DVD), and a Blu-ray disc (BD).

10. An optical disc drive comprising:
an optical pick-up device comprising a main optical sensor configured to receive a beam reflected from a disc;
a mechanical system configured to perform focusing and tracking operations of the optical pick-up device with respect to the disc;
an information processing unit configured to process a signal output from the main optical sensor; and
a servo unit for controlling the mechanical system,
wherein the optical pick-up device comprises:
an optical source;
an object lens configured to focus a beam from the optical source on a disc;
a main optical sensor configured to generate an electrical signal by receiving a beam reflected from the disc; and
a photo detecting element comprising an optical sensor configured to generate a monitoring signal by detecting a beam output from the optical source, a first operational amplifier configured to amplify a signal from the optical sensor, a non-linear multi-step variable resistor formed integrally within the photo detecting element and configured to adjust a gain of the amplifier in response to an external signal, and a second operational amplifier configured to amplify a signal from the non-linear multi-step variable resistor,
wherein an input of the non-linear multi-step variable resistor is electrically connected to an output of the first operational amplifier, and an output of the non-linear multi-step variable resistor is electrically connected to an input of the second operational amplifier.

11. The optical disc drive of claim 10, wherein the non-linear multi-step variable resistor comprises:
a plurality of fixed resistors; and
a selector switch configured to select one of the plurality of fixed resistors in response to the external signal.

12. The optical disc drive of claim 11, wherein the photo detecting element comprises three non-linear multi-step variable resistors which are arranged to correspond to wavelengths of beams for a compact disc (CD), a digital versatile disc (DVD), and a Blu-ray disc (BD).

* * * * *